(12) United States Patent
Loosveld

(10) Patent No.: US 9,609,848 B2
(45) Date of Patent: Apr. 4, 2017

(54) METHOD AND SYSTEM FOR LOCALIZING AND DISPLAYING POSITIONS OF AUTONOMOUSLY MOBILE OBJECTS

(71) Applicant: Lely Patent N.V., Maassluis (NL)

(72) Inventor: Serge Louis Loosveld, Maasland (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 14/767,493

(22) PCT Filed: Jan. 31, 2014

(86) PCT No.: PCT/NL2014/050055
§ 371 (c)(1),
(2) Date: Aug. 12, 2015

(87) PCT Pub. No.: WO2014/126459
PCT Pub. Date: Aug. 21, 2014

(65) Prior Publication Data
US 2016/0021849 A1 Jan. 28, 2016

(30) Foreign Application Priority Data
Feb. 12, 2013 (NL) ...................................... 2010287

(51) Int. Cl.
*G08B 23/00* (2006.01)
*A01K 11/00* (2006.01)
(Continued)

(52) U.S. Cl.
CPC .......... *A01K 11/006* (2013.01); *A01K 15/023* (2013.01); *A01K 27/009* (2013.01);
(Continued)

(58) Field of Classification Search
None
See application file for complete search history.

(56) References Cited

U.S. PATENT DOCUMENTS

2006/0111123 A1* 5/2006 Nerat .................... G06K 7/0008
455/456.1
2007/0222674 A1* 9/2007 Tan ......................... G01S 19/49
342/357.32

(Continued)

FOREIGN PATENT DOCUMENTS

EP          1 212 939 A1    6/2002
WO       2009/135493 A1    11/2009

OTHER PUBLICATIONS

NEDAP Livestock Management, "Nedap Dairy Management: Cow Positioning and Heat Detection", COWS, (2013), XP-002715306.
(Continued)

*Primary Examiner* — Adolf Dsouza
(74) *Attorney, Agent, or Firm* — Oblon, McClelland, Maier & Neustadt, L.L.P.

(57) ABSTRACT

A method of and system for localizing, and displaying positions of, one or more autonomously mobile objects within plural physically delimited areas, having physical boundaries, in an animal housing. The method includes determining a position of at least one of the objects within the animal housing; displaying the position of the at least one object on a map of the animal housing on a visual display device; and validating the determined position before displaying the position. The validating includes: correcting the determined position into a corrected position within the physically delimited area, and providing the corrected position as the position to be displayed, or otherwise providing the determined position as the position to be displayed. The correction may be dependent on object type and/or status.

18 Claims, 3 Drawing Sheets

Figure 1:
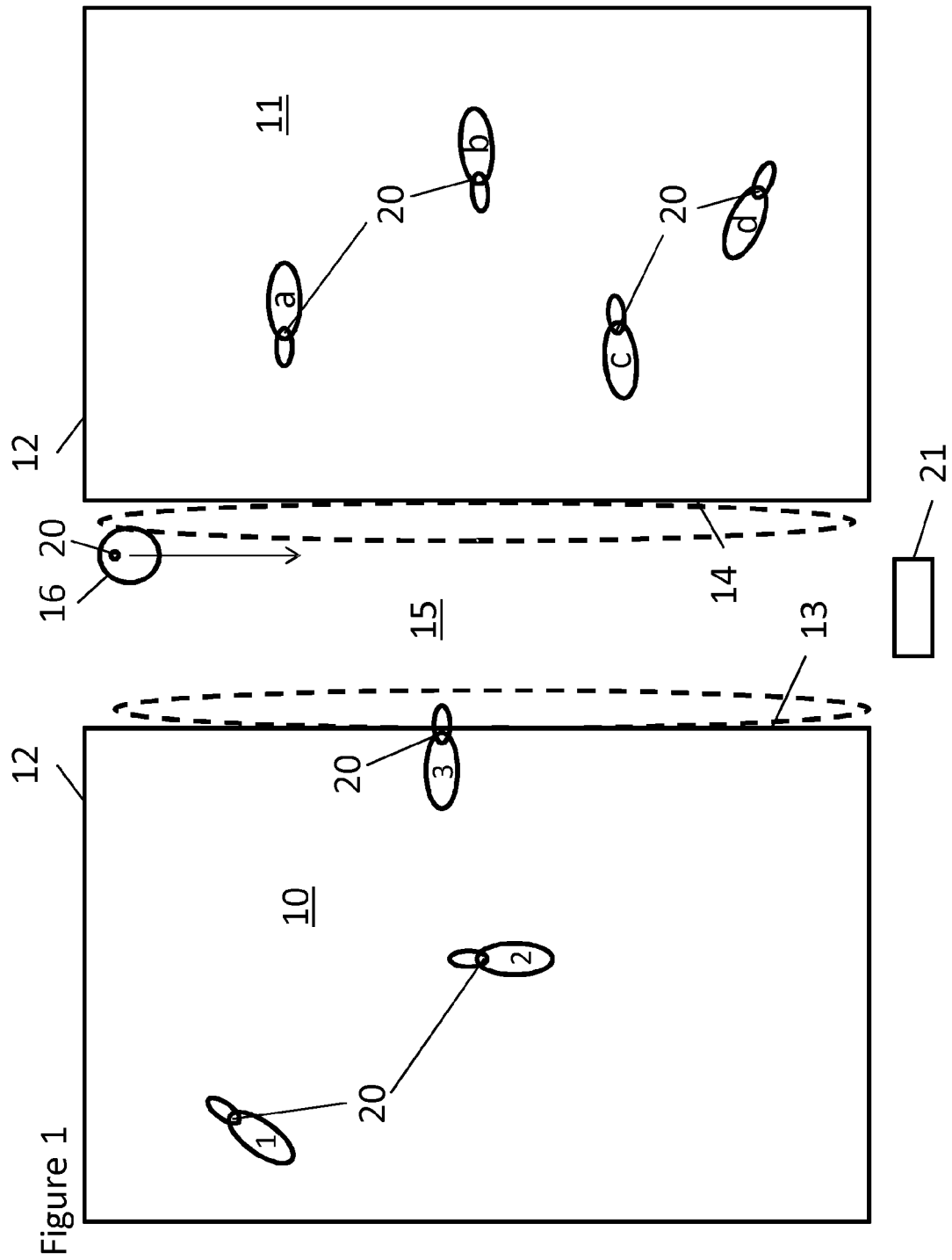

(51) Int. Cl.
 *A01K 15/02* (2006.01)
 *A01K 29/00* (2006.01)
 *G01S 5/02* (2010.01)
 *G01S 5/16* (2006.01)
 *A01K 27/00* (2006.01)
 *G01S 1/02* (2010.01)

(52) U.S. Cl.
 CPC .............. *A01K 29/005* (2013.01); *G01S 1/02* (2013.01); *G01S 5/021* (2013.01); *G01S 5/0252* (2013.01); *G01S 5/16* (2013.01)

(56) References Cited

U.S. PATENT DOCUMENTS

| 2008/0191941 A1* | 8/2008 | Saban ..................... G01S 3/023 342/450 |
| 2008/0192855 A1 | 8/2008 | Shapira et al. |
| 2009/0154621 A1 | 6/2009 | Shapira et al. |
| 2011/0102154 A1* | 5/2011 | Hindhede ............ A01K 29/005 340/10.1 |

OTHER PUBLICATIONS

International Search Report Issued Mar. 13, 2014 in PCT/NL14/050055 Filed Jan. 31, 2014.

\* cited by examiner

METHOD AND SYSTEM FOR LOCALIZING AND DISPLAYING POSITIONS OF AUTONOMOUSLY MOBILE OBJECTS

The present invention relates to a method to localise and display positions of one or more autonomously mobile objects within a plurality of physically delimited areas.

A system to determine a location of an animal is for example marketed by NEDAP Livestock Management, Groenlo, the Netherlands as 'Nedap Cow Positioning and Heat Detection'.

It is desirable to know the location of an animal, for example a cow, in a physically delimited area in which the animal can freely move. Such physically delimited area is for instance a walled or fenced part of stable.

Animal location systems are known to determine the location of an animal. Such animal location system may comprise tags that are carried by the animals, for instance integrated in a neck collar. A location determination system may be provided to determine a location of each of the tags.

If an animal is close to the boundary of the physically limited area, typically closer to the boundary than the measurement accuracy of the animal location system, the animal location system may determine a present location of the animal outside the physically delimited area.

Presenting the location of the animal, for example on a display such as a computer screen, at a location outside the physically limited area in which the animal is held is undesirable, as the user may feel confronted with unreliable information. As a result the user may find the system unreliable.

The object of the present invention is to provide a method of the kind mentioned above, that allows to more reliably determine and/or indicate the location of the animal in a physically delimited area.

The object is achieved with a method according to the present claims, in particular a method of localising, and displaying positions of, one or more autonomously mobile objects within a plurality of physically delimited areas, having physical boundaries, in an animal housing, the method comprising determining a position of at least one of the objects within the animal housing, displaying the position of the at least one object on a map of the animal housing on a visual display device, and validating the determined position before displaying the position. The step of validating comprises assigning the object to one of the physically delimited areas, comparing the determined position with first boundary data representative of the physical boundaries of said physically delimited area, if the determined position of the object is outside said physically delimited area, correcting the determined position into a corrected position within said physically delimited area, and providing the corrected position as the position to be displayed, otherwise providing the determined position as the position to be displayed. Such a method is e.g. able to correct for "impossible" positions, such as in a wall or the like. Providing corrected positions allows a more efficient and reliable management of the animal housing. Even though this step of correcting the position when deemed necessary may look like a small step, it still saves some time, because this same step is taken by every operator looking at the display anyway, which would thus distract from providing the needed information quickly and efficiently. It is important to note that the correction takes place only when some impossible position outside the assigned physically delimited area is found, and not if the position is anywhere within that area. Furthermore, the ability to correct will have more possible implications, as will be elucidated upon herein below.

Herein, the step of "assigning" may be performed automatically, i.e. by the system, or by the user of the system. In the latter case, the user may e.g. enter into a register or the like of the system which physically delimited area is intended for which object. Note that it is possible that the physically delimited area that is assigned to an object may vary in time, i.e. an object may be assigned a first area during a first time period, and a second area during a second period. Furthermore, each assigned area may comprise several part areas. Often, these part areas of one assigned area will be interconnected, although that is not necessary as, e.g. an object may be transferred by a farmer from one part area to another area, these two belonging to the same (grand) assigned area.

The animal housing is deemed to comprise any area with boundaries within which the autonomously mobile objects are supposed to be kept, at least temporarily. In most cases, this will be a stable (complex) or the like, but it may also comprise a meadow or other specific outside area. The presence of physical borders is required, although they could comprise e.g. a river. The boundaries may comprise walls, gates or the like. The positions of these boundaries, physically delimiting an area, may be, and preferably are, stored in a localisation system, a processing system, and so on. By comparing a determined position with these boundary positions, at least to those of the assigned area(s), i.e. by determining whether the determined position is within those boundaries, it can be established whether the determined position is ok or needs correction, or gives rise to some other action.

Particular embodiments of the invention will be described in the dependent claims, as well as in the description that follows.

The step of determining the position may comprise any suitable automatic technology or method known per se. This may comprise radio beaconing ("radar"), object recognition by means of optical camera, 3D cameras and so on, as long as position information is provided for one or more separate objects.

The step of displaying the position may comprise outputting the position in a human readable form, such as a blip on a screen, a coloured spot, an ID indication and so on, on a display.

In some embodiments, the method comprises assigning an object type to the object from a plurality of object types, according to at least one assigning criterion. The assigning of the object type may be performed automatically by the system, or may be entered by a user into the system. This allows a.o. to couple different information with the object as localised and displayed, which helps a user in managing the animal housing and the autonomously mobile objects therein. The assigning criterion relates in particular to one of assigning "human" according to a "human" criterion, assigning "animal" according to an "animal" criterion and assigning "vehicle" according to an "autonomously mobile vehicle" criterion, in particular wherein the object is assigned to one of the physically delimited areas in dependence of the object type. Note that the particular name for the object type is irrelevant, and that only the concept behind that name, i.e. the true type, is relevant here. Having more object types, or at least the possibility thereto, allows to correct differently for the different object types. This is an important difference with respect to e.g. car navigation systems that always position a car on a road, and anyway can only position one item at a time. Contrarily, for example, the system of the present invention can correct the position of a first object, that was determined to be in a wall between a first and a second area, back to a first area, while correcting the position of a second object also determined to be in that position back to the second area, just because the second object is supposed to be in the second area, while the first object is supposed to be in the first area. This difference is helpful in the practice of managing of an animal housing, as in many practical animal housings there can e.g. be a number of animals and a number of autonomously moving vehicles. The latter may sometimes come in the same area as the animals, but sometimes they are to be kept separated.

In particular, an object with the object type "human" is selected from the group of humans, in particular dairy related humans, "animal" is selected from the group of livestock animals, in particular dairy animals, or cattle, and "autonomously mobile vehicle" is selected from the group of vehicles arranged to perform a livestock-related action, in particular mobile milking robot, feeders, feed pushers, feed transporters, and dung scrapers. It is of course possible to provide more object types, such as other objects or more finely structured object types. However, the three types provided here are practical and useful examples of object types that may be present in an animal housing, and that may require a different approach. It is furthermore noted that "autonomously mobile" means intended to move on its own, as are animals in, in particular, a free hosing environment, the autonomous vehicles, and humans, in particular humans officially admitted into the animal housing.

As mentioned above, the assigning of object type can be done manually. However, in order to relieve an operator of this task, it is also possible that the step of assigning an object type comprises using an object recognition device, and assigning an object type in dependence of the object as recognised. It is advantageous if said object recognition device comprises, such as in a register or other database, one or more criteria according to which it is configured to assign an object type to an object. Such criteria could comprise any suitable criterion, from a size or shape criterion to sound identification criteria and so on. For example, the object recognition device comprises an optical object recognition device, having an image capturing device and image recognition software, including a criterion with which it is able to determine whether an object in the image is an animal, at least an animal that is intended to be in the animal housing, or a human or an autonomous vehicle. A suitable criterion for a cow environment could relate to assigning "animal" to an object "having four legs and being of a size of about 2½ m long by 1½ m high by 0.8 m wide" for an average Holstein Friesian cow, assigning "human" to "having two legs and being of a size of about 1-2 m high" and assigning "vehicle" to "having no legs". Of course, other criteria can be used according to the actually used and/or present objects.

In special embodiments, the method comprises providing at least one tag on at least one object, preferably on each object, and providing a tag localisation system. This is a special form of using automated ID recognition, as the tag will supply ID information upon interrogation by an interrogation signal, such as detection by or at an animal ID station, or even emitted actively, such as a beacon. This uses for example the circumstance that all dairy animals must be earmarked, the earmark being optically readable, or that most dairy animals will be tagged, in particular those that are milked automatically, the latter tags often being e.g. RF tags. Such tag that is already there may now be put to use in the present system. It may sometimes be helpful to provide more tags and/or tags providing an orientation, e.g. in case of objects of at least a predetermined extent, in particular larger than a location accuracy of the localisation. For example, a cow having a length of 2.5 m and having a central tag may still cover an area with a radius of 1.25 m around that tag. If the position accuracy of the localisation is better than 1.25 m, then information about the cow's position can be gained by providing two tags, one at the neck and one at the tail (bone) for example. Alternatively, it is also possible to provide a tag that provides orientation information, it then sufficing to have a tag at an end of the cow, preferably near the head such as around the neck.

In advantageous embodiments, the step of assigning an object type further includes assigning an object status, according to at least one status criterion, such as "loading" for an autonomous vehicle or "in cubicle or milk box" for an animal, and wherein the step of assigning the object to one of the physically delimited areas is made in dependence of the object status. In other words, in this embodiment the physically delimited area is made dependent on the status of the object. This makes use of the insight that sometimes the animal or other object is confined to a particular (sub) area. As an example, a dairy animal may be milked in a milking box, such as a robotic milking system. If an animal is being milked, thus getting the status "in milk box", then it is assigned to that milk box, meaning that its position, if (slightly) deviant is correct to within that milking box, while other animals, if determined to be within the boundaries of that milking box, are corrected to outside the box. In particular, the step comprises changing an object status, according to an object change criterion. The latter may comprise e.g. detection at, or admission into, a separate animal station or animal area, such as a separation area. The status is therefore preferably dynamic, indicating that the status may change, although the object type generally can not change.

The method comprises, in certain embodiments, providing a plurality of said objects, in particular having different object types and/or different object statuses and/or different physically delimited areas assigned thereto. As already mentioned in the above, one of the advantages of the present invention is that different objects may be assigned to different areas. This assigning may be dependent on the objects themselves, thus simply a matter of assigning, or on the object type, for example when having animals and vehicles strictly separated, or on the status, which may give rise to different physically delimited areas being assigned to the object. All this allows to provide a flexible and dynamic system for monitoring the objects in the animal housing, while not providing distracting information.

In particular, the method comprises calculating a distance between the determined position and the position to be displayed, and providing a signal, such as an alarm signal or correction instruction, if said distance is larger than a predetermined threshold distance. In such cases, it could be that the position should not be corrected, because it indicates that the object has left the assigned physically delimited area. This in turn may indicate a breach in a wall, a malfunctioning gate, or even a theft. In such a case, the step of correcting the determined position is overruled, thus the displayed position being the determined position, all this to prevent important information from going unnoticed. The alarm signal could be a message to an operator, to e.g. a mobile phone or computer system. The alarm may also comprise displaying a special status on the display, such as a blinking of the displayed position indicator, or of a different colour or the like. The correction instruction could relate to an instruction to a vehicle to perform a corrective action, such as returning to a known reference point or the like, to reset or recalibrate a vehicle navigation system. It may also relate to a step to repeat the step of determining the position of the object. This may lead to a more accurate position determination, as use may be made of e.g. averaging techniques. In particular, when the position is determined using RF tags, it is advantageous to determine a position only once, unless the determined position is corrected into a corrected position, in particular the distance between the determined position and the position to be displayed being above the threshold, in which case the position is determined at least once more. The advantage hereof is that only in case of an uncertain position determination (position has to be corrected, or corrected too much) the RF tag is interrogated at least once more, which limits the energy consuming step of interrogation and emitting a signal to cases in which this turns out to be advantageous.

The predetermined threshold distance may be selected according to any desired criterion, but is in particular a measurement accuracy of the animal location system, more in particular a measurement accuracy based criterion. That is, if within the measurement accuracy the determined position is outside the assigned area, it must be concluded that the object is in an undesired position.

In embodiments, the corrected position of an object is the location within the physically delimited area to which the object is assigned, that is closest to the determined position. In other words, if the determined position is corrected, it is corrected to the nearest possible position. It is then assumed that this is the true position, or at least the one with the highest likelihood to be the true position.

In some embodiments, the step of displaying the position comprises displaying any determined position using a first type of indication, and displaying any corrected position using a second type of indication that differs from the first type. For example, any determined position that is displayed, i.e. is not corrected, is shown in green, while any displayed and corrected position is shown in red, or a constant signal versus a blinking signal, and so on. This indicates that something may be wrong, either with the particular object (or tag) of which the position is shown with the second type, or with the system.

The invention also relates to an object localisation and display system configured to determine and display a position of one or more autonomously mobile objects within a plurality of physically delimited areas, having physical boundaries, in an animal housing, in particular arranged to perform the method of the present invention. In particular, the system comprises a localiser, comprising an object position signal receiving system with at least one receiver configured to receive position related signals from the one or more objects, a processing system, configured to process the received signals and to determine a position of at least one of the objects within the animal housing, a visual display device to display the position of the at least one object on a map of the animal housing, characterized in that the processing system is configured to store a plurality of boundary data representative of the physical boundaries of the plurality of physically delimited areas, the processing system is configured to store assignment data comprising which of the physically delimited areas is/are assigned to which object, in that the processing system is configured to compare the determined position of the object with the stored boundary data representative of the physically delimited area assigned to said object, and in that the processing system is configured to correct, if the determined position of the object is outside said assigned physically delimited area, the determined position into a corrected position within said physically delimited area, wherein the display device is configured to display said object on the map at the corrected position within said physically delimited area, if the determined position of the object is outside said physically delimited area, and in particular a location within the first physically delimited area which is closest to the determined position, the determined position, otherwise. The advantages as described for the method in principle also apply to the device.

Again, the assignment data may be from a user or be self generated, e.g. based on object recognition and one or more assigning criteria.

The processing system may comprise a suitably programmed computer or a set of suitable processors or similar hardware. Even cloud computing may be a possibility.

The one or more physically delimited areas may be a part of, or all of, one or more, possibly interconnected, animal housing areas, such as a stable or a pasture, or even as small as a milking box or a cubicle.

In embodiments, the corrected position of an object is the location within the physically delimited area to which the object is assigned, that is closest to the determined position. This allows to efficiently correct the position, based on the statistically most probable position. This correction may relate to a determined position inside a wall of the animal housing or milking box, or between two cubicles or the like, which is impossible. All this also holds for the present method.

In embodiments, the display device comprises at least one of a computer screen and a screen of a portable device such as a mobile phone. Other means of displaying are not excluded, though, such as a head-up display or virtual reality glasses. This allows efficient monitoring and management, both when present in or while away from the animal housing. It is to be noted that present day animal housings may house several hundreds or even thousands of animals, and may comprise other environments, for example feed kitchens, in which there are one or more autonomous vehicles, such as the Lely Vector™. Having an overview over such large spaces, at a glance without having to correct positions mentally, offers clear efficiency advantages.

In some embodiments, the display device may be arranged to display any determined position using a first type of indication, and to display any corrected position using a second type of indication that differs from the first type. As mentioned for the method, this may help in providing useful information about object position or even the system itself at a glance.

The localiser, that is configured to localise the one or more objects, comprises an object position signal receiving system with at least one receiver configured to receive position related signals from the one or more objects, which allows the processing device to determine the positions. In particular, the object position receiving system comprises at least one optical receiver and/or at least one radio signal receiver. In case of an optical receiver, particular relevance is given to a (video) camera, while e.g. a radio antenna could be used for receiving radio signals. In such a case, it is helpful if the objects themselves, or at least the environment, comprise a source of the radiation to be received, such as optical radiation (a.o. light) or a radio signal, like a beacon.

In embodiments, the localiser comprises at least one emitter for emitting radiation to be reflected by the at least one object in order to provide position related signals. This means that there need not be a source of the radiation in the objects, which allows simpler, more compact objects, or for example allows to have only one source. Such a source could be as simple as a lamp, or also a dedicated radiation source such as a (near) infra-red lamp, or a radio source such as for radar. Having a source also makes the system less dependent on ambient conditions, such as the intensity of sunlight.

In certain embodiments, the localiser comprises an object identification system configured to establish an identity of at least one of the objects. This enables the automatic assignment of an object type, and connected therewith the assignment of a physically delimited area. For example, the object recognition system comprises visual object recognition software, when combined with a visual receiver such as a video camera. Other object recognition systems may also be employed, such as RFID chip/tag systems. In particular, the display is arranged to display the position and an indication related to the established identity of the object, more in particular the established identity, and/or the type of the object. The latter could even comprise an identification code, such as the cow's name or number, and so on.

Advantageously, the processing system is arranged to determine a distance between the determined position and the corrected position, and the object localisation and display system is configured to provide an alarm signal if the distance is larger than a predetermined threshold distance, in particular larger than a measurement accuracy of the animal location system, more in particular according to a measurement accuracy based criterion, in each such case the system is configured not to display the corrected position but the determined position. This allows, as mentioned before, to distinguish between positions that give rise to a warning, and those that just need a correction. In particular, in case the determined position of an object is outside the assigned area, an alarm may be given, such as by an alarm giver comprised in the system, e.g. a siren or flash light or the like.

In particular, the system is configured to provide an alarm signal if, within a predetermined time interval, the determined position of an object, such as of a tag, is outside the first physically delimited area more than a predetermined number of times. This allows accepting an outlier localisation, i.e. a localisation in which the position is determined to be outside the assigned area just once. Then, it is assumed that the determination is erroneous, and need not be given further attention. Herein, as for the method, it is understood that the localiser determines the position of the one or more objects repeatedly or continuously, in order to be able to determine their present position, as they are after all autonomously mobile objects. However, if more than once a position is determined to be outside an assigned areas, the alarm is given. Such a situation may relate to the position of a certain object being determined to be outside the area repeatedly, and/or the position of a plurality of objects to be outside their respective assigned area repeatedly. For example, it could be that a vehicle took a wrong turn, or an animal slipped through some fence or a malfunctioning gate or the like. Alternatively, this may be an indication of a malfunctioning localisation system, which also may require an alarm.

Additionally or alternatively, in case the object is of the type "vehicle" and comprises a navigation system, the processing system is arranged to determine a distance between the determined position and a vehicle position as calculated by said navigation system, and the object localisation and display system is configured to provide a correction instruction to the vehicle if the distance is larger than a predetermined threshold distance. In such a case, the system of the invention notices that the vehicle's navigation system apparently steers the vehicle to an undesired, wrong position. Then the system of the invention may instruct the vehicle to start some corrective action. The correction instruction may for example comprise a position recalibration action, a vehicle resetting action, a navigation system resetting action, a vehicle return action, and so on.

In an embodiment, the system further comprises a plurality of tags, wherein each tag is to be carried by one of the objects and is arranged to emit a position related signal. This emitting a position related signal may be just reflected radiation, allowing the system to determine the position, or could also or additionally be an active signal, such as a beacon signal or light signal. The signal may also comprise a triggered signal, such as from an RFID chip. Such a signal would provide position information to a directional antenna or the like, and also ID information.

In the present invention, the or each object is one of a dairy animal, a human and an autonomously mobile vehicle configured to perform an animal related action, such as floor cleaning, feeding, and/or feed pushing. In modern animal stalls, there are not only often a high number of animals, but also a number of autonomous vehicles, which may give rise to dangerous situations if all these would unintended come to move in the same area. Having the present system available allows to monitor the objects to ensure a correct operation of the animal housing. Still, even without having vehicles around, the possibility to monitor the animals with an efficient and reliable check on their position offers improved management features. For example, if a dairy cow has to be separated, it is advantageous to be able to check whether the animal remains in the designated separation area.

Figure 2:
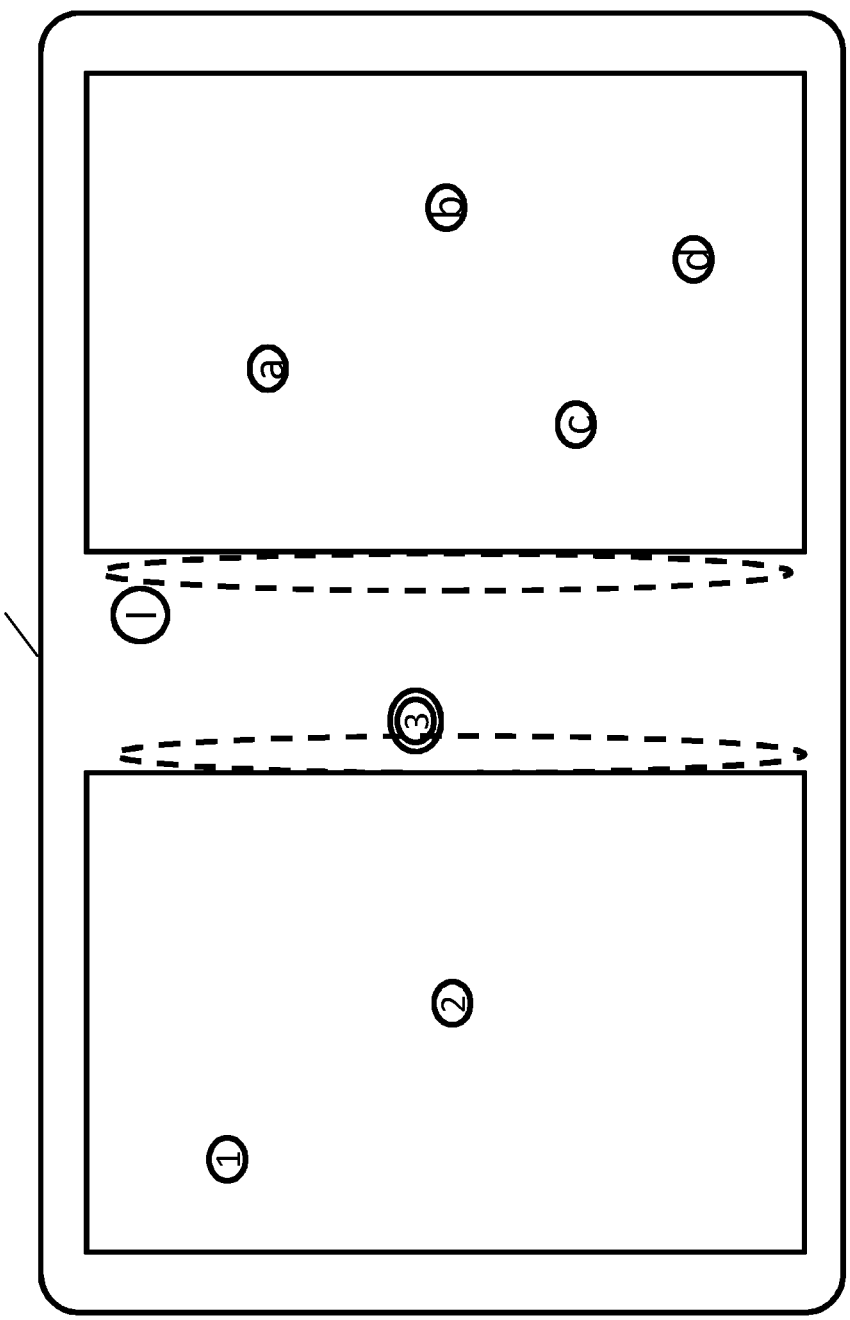
Figure 3:
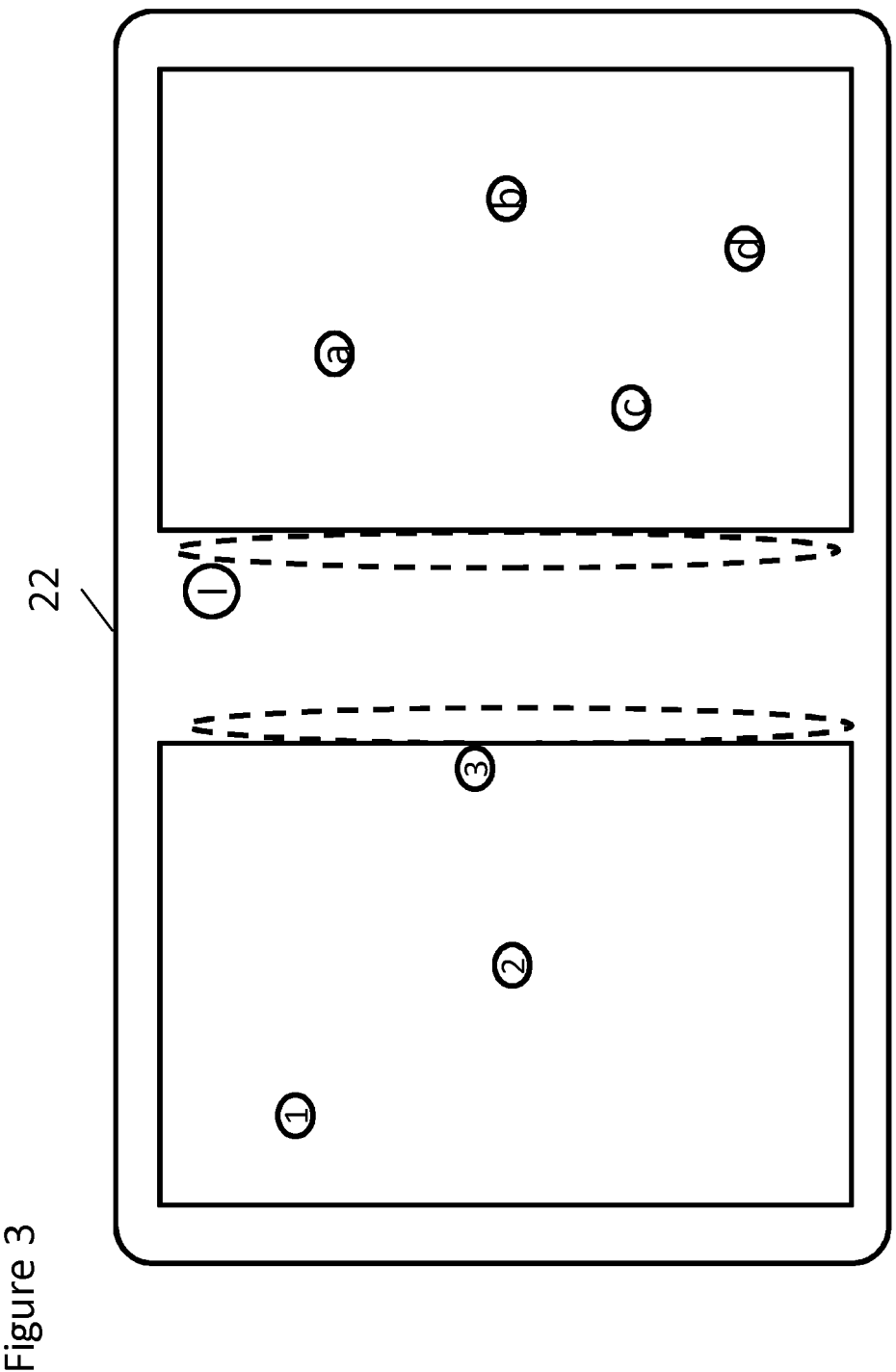

An embodiment of an animal location system according to the invention will now be described in further detail, by way of example only, with reference to the accompanying drawings, in which:

FIG. 1 shows a schematic top view of a stable with an animal location system; and FIGS. 2 and 3 shows views on a display device.

FIG. 1 shows a top view of a stable area. The stable area comprises a first stable floor 10 and a second stable floor 11. The first stable floor 10 is delimited by walls 12 and a feeding fence 13 enclosing a number of cows 1, 2, 3. The second stable floor 11 is delimited by walls 12 and a feeding fence 14 enclosing a number of cows a, b, c, d.

Between the first stable floor 10 and the second stable floor 11 a feed alley 15 is provided. The feed alley 15 is configured to provide food, such as hay, to the cows in the stable area, i.e. first stable floor 10, second stable floor 11 and feed alley 15.

A feed pusher 16 is present in the feed alley 15 to push food towards the feed fences 13, 14. This is an unmanned vehicle that autonomously can move and perform it tasks. Further unmanned vehicles may be provided for other tasks.

An animal location system is provided to determine the location of the cows 1-3, a-d, and of the feed pusher 16. The animal location system comprises multiple tags 20 and a location determination system 21 configured to determine a position of each of the tags 20, to thereby determine positions of the cows 1-3, a-d. The multiple tags 20 and the location determination system 21 may be designed as any system capable of determining a position of each of the tags 20 within the respective measurement area. Any position measurement technique may be used.

Each of the cows carries a tag 20, for example a tag integrated in a collar placed around the necks of the cows.

The tags 20 are subdivided in groups, wherein each object, or group of objects, such as a group of tags, is associated with a physically delimited area, such as the first stable floor 10, the second stable floor 12 and the feed alley 14.

Thus, tags 20 of a first group of tags are carried by the cows 1-3 on the first stable floor 10, tags 20 of a second group of tags is carried by the cows a-d on the second stable floor 11, and a tag 20 of a third group of tags is carried by the feed pusher 16, whereby the first, second and third group of tags 20 are associated to the first stable floor 10, the second stable floor 11 and the feed alley 15, respectively.

Each tag 20 has a tag group setting indicating to which group of tags the tag belongs. This corresponds to each object having an object type and/or object status. By adapting the tag group setting 9 or object status), the tag 20 may be allocated to different groups, for instance if a cow is moved from the first stable floor 10 to the second stable floor 11. As a result, the tag 20 carried by the cow does not have to be exchanged by another one, but only the tag group setting (or object status) of the tag 20 has to be changed. The tag group setting is for example a value set in the location determination system 21 linked to a tag identification number of the respective tag 20. The tag group setting may also be stored in the tag 20 itself.

The location determination system 20 may be part of a central processor device, and for instance be a part of a cow monitoring system. The location determination system comprises a storage device to store first boundary data representative for the physical boundaries, i.e. walls 12 and feed fences 13, 14 of the first stable floor 10, the second stable floor 11 and the feed alley 14 there between.

The location determination system 20 further comprises a display device to display a location of the cows 1-3, a-d and the feed pusher 16. FIGS. 2 and 3 show a view on the display device generally indicated by 22.

The display device 22 displays an overview of the stable area including the first stable floor 10, the second stable floor 11 and the feed alley 15. The display device 22 further indicates the location of the cows 1-3, a-d and the feed pusher 16. Each of the cows is displayed by a circle with a number or letter, and the feed pusher 16 is displayed by a circle with an I.

In FIG. 2, the determined positions of the cows and the feed pusher 16 are shown. Cow 3 is shown outside the first stable floor 10 in the feed alley 16, while this cow 3 is present on the first stable floor 10.

This is a result of the measuring inaccuracy of the animal location system. Although the cow 3 is accurately shown at the determined position, it may be undesirable to display the cow 3 at this position, as it may give the impression to the user that the cow 3 is in the feed alley 16. Therefore, the invention proposes to correct the determined position into a corrected position within the area of the first stable floor 10.

The corrected position of cow 3 is calculated as follows. The location determination system 20 is configured to compare the determined position of each of the objects, such as cow 3, and based on the position of tags 20, with the stored first boundary data of the respective area to which the object is assigned. In this case, the determined position of cow 3 is compared with the stored location of the walls 12 and feed fence 13 of the first stable floor 10. As the determined position of cow 3 is outside the stored location of walls 12 and feed fence 13, the determined position (shown in FIG. 2) is corrected into a corrected position (shown in FIG. 3). This corrected position is within the respective area associated with the cow, or tag 20, of which the position is determined. The corrected position is calculated as the location within the first physically delimited area, in this case the first stable floor 10, which is closest to the determined position. The corrected position may also be calculated in other ways.

By showing on the display device 22, the cows 1-3, a-d and the feed pusher 16 in the areas where they should be, e.g. based on the tag group setting of the respective tags 20, the user is confronted with a more reliable and accurate view. This may give more confidence in the animal location system.

It is remarked that the animal location system may be configured to provide an alarm signal if the distance between the determined position and the corrected position is larger than a measurement accuracy of the animal location system, in particular according to a measurement accuracy based criterion. For example, if the measurement accuracy is within 1 meter, and the difference between the determined position and the corrected position is substantially larger than 1 meter, for example 3 meters, this may indicate that the cow is not located in the assigned area. This may for example be the case if a cow is moved from the first stable floor 10 to the second stable floor 11 without changing the status of, or tag group setting of the tag carried by, this cow.

In such case, an alarm signal may be provided to indicate that the user should check the actual position of the cow and/or object status (or tag group setting) of the cow (or tag).

Similarly, the animal location system may be configured to provide an alarm signal if, within a predetermined time interval, the determined position of the object, or tag of the first group of tags, is outside the respective first physically delimited area more than a predetermined number of times. If multiple times the determined position of one or more cows is outside the stable floor associated with that cow, this may indicate that the system does not properly function, and/or that the one or more cows are no longer present within the physically delimited area associated with the one or more cows.

A reason for disfunctioning of the system may be that the location of the walls 12 and feed fences 13, 14 are not properly stored in the storage device. Therefore, the animal location system is configured to propose an adaptation of the stored first boundary data, if, within a predetermined time interval, it is determined on the basis of the first boundary data that the determined position of the object is outside the first physically delimited area more than a predetermined number of times.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method of localizing, and displaying positions of one or more autonomously mobile objects within a plurality of physically delimited areas, having physical boundaries, in an animal housing, the method comprising:
   determining a position of at least one of the objects within the animal housing;
   displaying the position of the at least one object on a map of the animal housing on a visual display device;
   validating the determined position before displaying the position, wherein the validating comprises:
      assigning the object to one of the physically delimited areas;

comparing the determined position with first boundary data representative of the physical boundaries of the physically delimited area;
if the determined position of the object is outside the physically delimited area,
correcting the determined position into a corrected position within the physically delimited area, and providing the corrected position as the position to be displayed, otherwise providing the determined position as the position to be displayed.

2. The method of claim 1, further comprising assigning an object type to the object from a plurality of object types, according to at least one assigning criterion, one of assigning human according to a human criterion, assigning animal according to an animal criterion, and assigning vehicle according to an autonomously mobile vehicle criterion, wherein the object is assigned to one of the physically delimited areas in dependence of the object type.

3. The method of claim 2, wherein an object with the object type:
human is selected from the group of humans, or dairy related humans;
animal is selected from the group of livestock animals, or dairy animals, or cattle;
vehicle is selected from the group of vehicles configured to perform a livestock-related action, or mobile milking robot, feeders, feed pushers, feed transporters, and dung scrapers.

4. The method of claim 2, wherein the assigning an object type comprises using an object recognition device, or an optical object recognition device, and assigning an object type in dependence of the object as recognized.

5. The method of claim 3, further comprising:
providing at least one tag on at least one object, or on each object; and
providing a tag localization system.

6. The method of claim 3, wherein the assigning an object type further includes assigning an object status, according to at least one status criterion, or loading for an autonomous vehicle or in cubicle or milk box for an animal, and wherein the assigning the object to one of the physically delimited areas is made in dependence of the object status.

7. The method of claim 2, further comprising providing a plurality of the objects, or having different object types and/or different physically delimited areas assigned thereto.

8. The method of claim 3, further comprising calculating a distance between the determined position and the position to be displayed, and providing a signal, or an alarm signal or correction signal, if the distance is larger than a predetermined threshold distance, or a measurement accuracy of the animal location system, or according to a measurement accuracy based criterion.

9. The method of claim 3, wherein the corrected position of an object is the location within the physically delimited area to which the object is assigned, that is closest to the determined position.

10. An object localization and display system configured to determine and display a position of one or more autonomously mobile objects within a plurality of physically delimited areas, having physical boundaries, in an animal housing, or arranged to perform the method of claim 1, the system comprising:
a localizer, comprising an object position signal receiving system with at least one receiver configured to receive position related signals from the one or more objects;
a processing system, configured to process the received signals and to determine a position of at least one of the objects within the animal housing;
a visual display device to display the position of the at least one object on a map of the animal housing;
wherein the processing system is configured to store a plurality of boundary data representative of the physical boundaries of the plurality of physically delimited areas;
the processing system is configured to store assignment data comprising which of the physically delimited areas are assigned to which object;
the processing system is configured to compare the determined position of the object with the stored boundary data representative of the physically delimited area assigned to the object; and
the processing system is configured to correct, if the determined position of the object is outside the assigned physically delimited area, the determined position into a corrected position within the physically delimited area;
wherein the display device is configured to display the object on the map at:
the corrected position within the physically delimited area, if the determined position of the object is outside the physically delimited area, or a location within the first physically delimited area which is closest to the determined position,
the determined position, otherwise.

11. The system of claim 10, wherein the display device comprises at least one of a computer screen and a screen of a portable device or a mobile phone.

12. The system of claim 10, wherein the localizer comprises at least one optical receiver.

13. The system of claim 10, wherein the localizer comprises at least one emitter for emitting radiation to be reflected by the at least one object to provide position related signals.

14. The system of claim 10, wherein the localizer comprises an object identification system configured to establish an identity of at least one of the objects, or wherein the display is configured to display the position and an indication related to the established identity of the object, or the established identity.

15. The system of claim 10, wherein the processing system is configured to determine a distance between the determined position and the corrected position, and wherein the object localization and display system is configured to provide an alarm signal if the distance is larger than a predetermined threshold distance, or larger than a measurement accuracy of the animal location system, or according to a measurement accuracy based criterion.

16. The system of claim 10, further comprising a plurality of tags, wherein each tag is to be carried by one of the objects and is configured to emit a position related signal.

17. The system of claim 10, configured to provide an alarm signal if, within a predetermined time interval, the determined position of the tag of the first group of tags is outside the first physically delimited area more than a predetermined number of times.

18. The system of claim 10, wherein each object is one of a dairy animal and an autonomously mobile vehicle configured to perform an animal related action, or floor cleaning, feeding, or feed pushing.

* * * * *